(12) United States Patent
Kim et al.

(10) Patent No.: US 11,855,313 B2
(45) Date of Patent: Dec. 26, 2023

(54) SEPARATOR ASSEMBLY FOR FUEL CELL AND FUEL CELL STACK INCLUDING SAME

(71) Applicants: Hyundai Motor Company, Seoul (KR); Kia Corporation, Seoul (KR)

(72) Inventors: Kyung Min Kim, Gyeonggi-do (KR); Han Gil Ko, Gyeonggi-do (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 9 days.

(21) Appl. No.: 17/696,507

(22) Filed: Mar. 16, 2022

(65) Prior Publication Data

US 2023/0058345 A1 Feb. 23, 2023

(30) Foreign Application Priority Data

Aug. 18, 2021 (KR) .......................... 10-2021-0108981

(51) Int. Cl.
| | |
|---|---|
| *H01M 8/0267* | (2016.01) |
| *H01M 8/0247* | (2016.01) |
| *H01M 8/0258* | (2016.01) |
| *H01M 8/2483* | (2016.01) |

(52) U.S. Cl.
CPC ....... *H01M 8/0267* (2013.01); *H01M 8/0247* (2013.01); *H01M 8/0258* (2013.01); *H01M 8/2483* (2016.02)

(58) Field of Classification Search
CPC ............. H01M 8/0267; H01M 8/0247; H01M 8/0258; H01M 8/2483; H01M 8/0228; H01M 8/0271; H01M 8/1004; H01M 8/0273; H01M 8/242; Y02E 60/50
See application file for complete search history.

(56) References Cited

U.S. PATENT DOCUMENTS

| | | | | |
|---|---|---|---|---|
| 2002/0172852 A1* | 11/2002 | Frank | ................ | H01M 8/0267 |
| | | | | 429/514 |
| 2004/0151975 A1* | 8/2004 | Allen | ................ | H01M 8/0206 |
| | | | | 72/379.6 |

FOREIGN PATENT DOCUMENTS

| | | | |
|---|---|---|---|
| KR | 2018-0096395 A | 8/2018 | |
| WO | WO-2005067086 A2 * | 7/2005 | ............... A61P 9/10 |

* cited by examiner

*Primary Examiner* — Helen Oi K Conley
(74) *Attorney, Agent, or Firm* — Fox Rothschild LLP (57) ABSTRACT

Disclosed is a separator assembly for a fuel cell and a fuel cell stack including the same. The separator assembly includes (I) a plate-shaped first separator including a first reaction area where a flow path to which a reaction gas or a coolant flows on a center thereof and first manifolds to which the reaction gas or the coolant is introduced or discharged to opposite side areas of the first reaction area, and (ii) a plate-shaped second separator integrated with the first separator by bonding and including a second reaction area corresponding to a position where the first reaction area is formed and second manifolds communicating with the first manifolds. The first and second separators may have at least a portion of an inner edge of the respective first and second manifolds that are bent, thereby being disposed on an interface between the first and second separators.

10 Claims, 5 Drawing Sheets

-PRIOR ART-

FIG. 3

-PRIOR ART-

SEPARATOR ASSEMBLY FOR FUEL CELL AND FUEL CELL STACK INCLUDING SAME

CROSS REFERENCE TO RELATED APPLICATION

The present application claims priority to Korean Patent Application No. 10-2021-0108981, filed Aug. 18, 2021, the entire contents of which is incorporated herein for all purposes by this reference.

TECHNICAL FIELD

The present invention relates to a separator assembly for a fuel cell and a fuel cell stack including the same. The separator assembly may preventing an inner cross-sectional part of a manifold from being corroded by being exposed to water, and to a fuel cell stack including the separator assembly.

BACKGROUND OF THE INVENTION

A fuel cell is a type of power generator for converting chemical energy contained in fuel into electric energy by electrochemically reacting in a stack, and may not only supply driving power for industry, homes, and vehicles but also may be used for supplying the power of small electronics such as a portable device. Further, in recent years, the use of the fuel cell is gradually expanding into a high-efficiency clean energy source.

Figure 1:
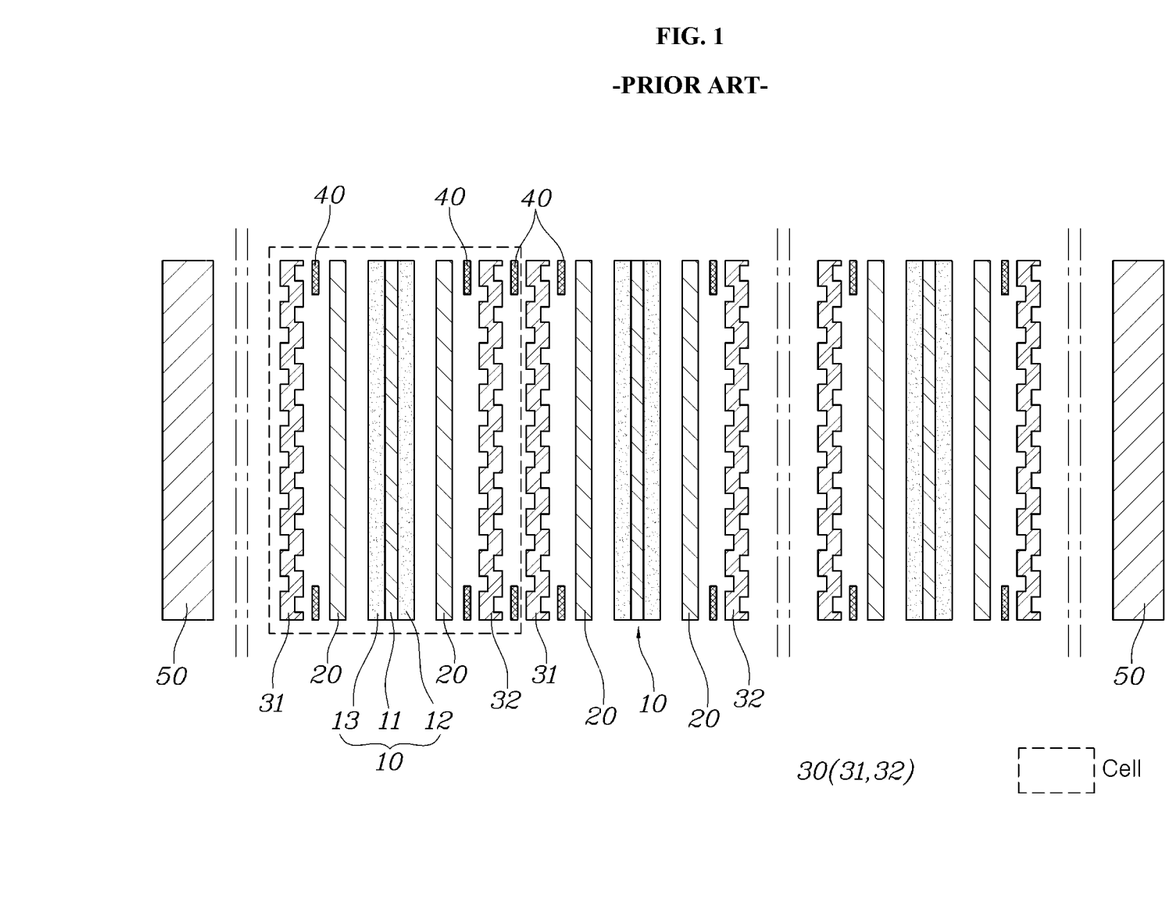
FIG. 1 show a conventional fuel cell stack.

FIG. 1 shows a conventional fuel cell stack in the related art. For example, a unit cell forming a typical fuel cell stack has a membrane electrode assembly (MEA) 10 located at the innermost portion thereof. The MEA 10 includes a polymer electrolyte membrane 11 capable of transporting hydrogen protons, and catalyst layers, that is, an anode 12 and a cathode 13, applied on opposite surfaces of the polymer electrolyte membrane 11 so that hydrogen and oxygen may react.

In addition, a pair of gas diffusion layers (GDLs) 20 are laminated outside of the MEA 10 where the anode 12 and the cathode 13 are located, and a separator assembly 30, having a flow field for supplying fuel and discharging water generated by reactions, is located outside of the GDLs 20 with gaskets positioned therebetween. At this time, the separator assembly 30 is formed by facing and bonding an anode separator 31 disposed on the anode 12 and a cathode separator 32 disposed on the cathode 13 to each other.

Meanwhile, the fuel cell stack is formed by laminating multiple unit cells, and end plates 50 that structurally support and secure individual components described above in position are assembled to the outermost portion of the unit cells that are laminated. At this time, the anode separator 31 disposed on any one unit cell is laminated to be disposed such that the anode separator 31 is in contact with the cathode separator 32 of other unit cell that is disposed adjacent to the one unit cell.

Accordingly, in order to perform a lamination process of the unit cell smoothly and to maintain an alignment of each unit cell, the unit cell is formed by using the separator assembly 30 in which the cathode separator 32 and the anode separator 31 of adjacent unit cells disposed to be in contact with each other are integrated. At this time, as the anode separator 31 and the cathode separator 32 that form the separator assembly 30 are bonded and integrated, manifolds communicate with each other. Further, a reaction surface of the anode separator 31 is formed in a shape similar to a reaction surface of the cathode separator 32 so as to be disposed on the same position to each other.

Figure 2:
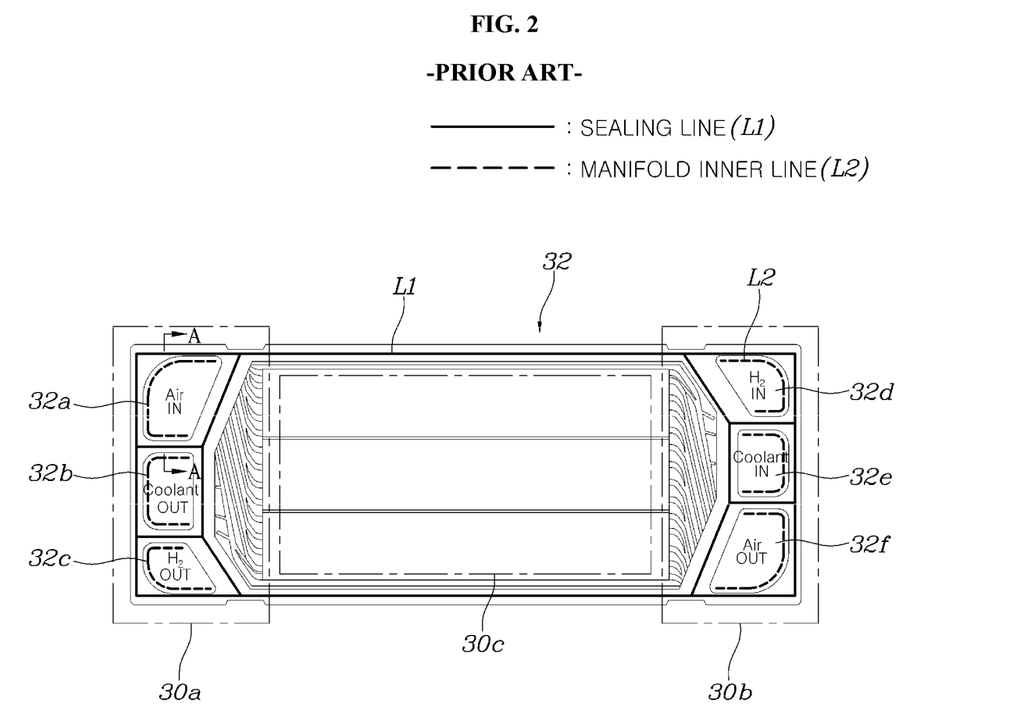
FIG. 2 shows a separator of a conventional fuel cell stack.

The shapes of the anode separator 31 and the cathode separator 32 in the related art are shown in FIG. 2. At this time, since overall configurations of the anode separator 31 and the cathode separator 32 are similar to each other, the cathode separator 32 will be used to describe the shape so as to avoid overlapping descriptions.

As illustrated in FIG. 2, in the cathode separator 32 that forms the conventional fuel cell stack, on a center portion of the cathode separator 32 is formed with a reaction area 30c that has a flow path to which a reaction gas or a coolant flows, and the cathode separator 32 is formed with a pair of manifold areas 30a and 30b that has multiple manifolds to which the reaction gas or the coolant is introduced or discharged to opposite sides of the reaction areas 30c. At this time, the multiple manifolds 32a to 32f formed on the manifold areas 30a and 30b are classified into the manifolds 32d and 32c to which hydrogen that is the reaction gas is introduced or discharged, the manifolds 32a and 32f to which air that is the reaction gas is introduced or discharged, and the manifolds 32b and 32e to which the coolant is introduced or discharged. At this time, a sealing line L1 that surrounds the reaction area 30c and each of the manifolds 32a to 32f is formed.

In addition, the cathode separator 32 is manufactured by using aluminum alloy or stainless steel. In order to impart conductivity that is one function of a separator to the cathode separator 32, a surface treatment that imparts conductivity to a surface of the separator is performed, or a noble metal, a conductive carbon, or the like is coated on the surface of the separator.

Meanwhile, the coolant and generated water that is generated by reaction of hydrogen and air that are the reaction gases flow through the multiple manifolds formed on the separator such as the anode separator 31 and the cathode separator 32, and inflow water sometimes flows with the reaction gas. Accordingly, there has been a problem that corrosion is generated on the manifolds, more specifically on inner cross-sectional parts of the manifolds, of the separator manufactured by using a metal material, due to the generated water, the coolant, and the inflow water.

Indeed, when a piercing treatment is performed on the separator during a process of forming the manifolds on the separator so as to form the manifolds on the separator, a substrate of the separator is exposed at a cross-sectional surface having the manifold shape, and the corrosion progresses on the exposed substrate. Therefore, in order to prevent this problem, as illustrated in FIG. 3, a structure in which an inner portion of the manifolds is surrounded by injecting a rubber material has been applied conventionally.

Figure 3:
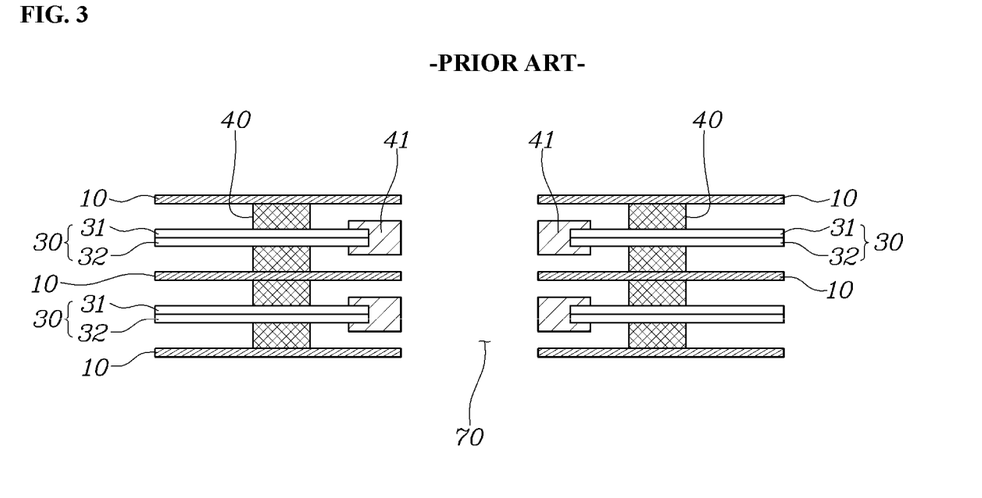
FIG. 3 shows a cross-section around manifolds formed on the conventional fuel cell stack.

FIG. 3 shows a cross-section around manifolds that are formed on the conventional fuel cell stack. Further, FIG. 3 shows a cross-sectional view taken along line A-A in FIG. 2.

As shown in FIG. 3, the separator assembly 30 is formed of the anode separator 31 and the cathode separator 32. Further, on opposite surfaces of the separator assembly 30, the MEAs 10 and support frames such as sub-gaskets that support the MEAS 10 are disposed. Reference numeral 10 is illustrated to denote MEA in FIG. 3. However, more specifically, reference numeral 10 illustrated in FIG. 3 illustrates a frame that supports the MEA 10.

At this time, since the manifolds formed on the anode separator 31 and the cathode separator 32 and the manifold formed on the frame that support the MEA 10 are communicate with each other, a flow path 70 to which the reaction gas or coolant flows is formed. The flow path 70 illustrated in FIG. 3 is the flow path 70 to which air is introduced, as illustrated in FIG. 2.

As described above, the multiple manifolds are formed on the anode separator 31 and the cathode separator 32. Further, in order to prevent the corrosion of the manifolds, anti-corrosion gaskets 41 that surround the inner cross-sectional parts of the manifolds are formed by injecting rubber material gaskets.

As the anti-corrosion gaskets 41 are formed, the separator substrate formed of the metal material in which the separator substrate forms the anode separator 31 and the cathode separator 32 so as to form the manifolds has been prevented from being corroded by being exposed to the generated water and the inflow water.

In addition, the anti-corrosion gaskets 41 may interrupt the reaction gas and the coolant to be introduced or discharged to the reaction area. Therefore, as a virtual manifold inner line L2 illustrated in FIG. 2, the anti-corrosion gaskets 41 have been formed on areas in an inner edge of the manifolds other than areas where the reaction gas or the coolant is introduced or discharged to the reaction area.

By forming the anti-corrosion gaskets 41, an effect of preventing the corrosion of the anode separator 31 and the cathode separator 32 may be realized. However, a problem that the rubber material is injected on a position other than the desired position due to the injection pressure that occurs when the rubber material is injected to form the anti-corrosion gaskets 41 occurs.

As the anti-corrosion gaskets 41 are formed on the undesired position, problems that the anode separator 31 and the cathode separator 32 are damaged or surface pressure becomes uneven when the fuel cell stack is laminated occurs.

The foregoing is intended merely to aid in the understanding of the background of the present invention, and is not intended to mean that the present invention falls within the purview of the related art that is already known to those skilled in the art.

SUMMARY OF THE INVENTION

In preferred aspects, provided is a separator assembly for a fuel cell in which an inner cross-sectional part of a manifold is bent so that the separator assembly is capable of preventing the inner cross-sectional part of the manifold from being corroded by being exposed to moisture, and a fuel cell stack including the separator assembly.

In an aspect, provided is a separator assembly for a fuel cell formed of a pair of separators including: a first separator formed in a plate shape, including a first reaction area on which a flow path to which a reaction gas or a coolant flows on a center portion thereof and multiple first manifolds to which the reaction gas or the coolant is introduced or discharged to opposite side areas of the first reaction area; and a second separator formed in a plate shape and integrated with the first separator by being bonded, including a second reaction area at a position corresponding to a position on which the first reaction area is formed and multiple second manifolds that communicate with the multiple first manifolds. The first separator may include at least a portion of an inner edge of the first manifolds to be bent toward the second separator, thereby being disposed on an interface with the second separator, and the second separator may include at least a portion of an inner edge of the second manifolds to be bent toward the first separator, thereby being disposed on the interface with the first separator.

The inner edge of the first manifolds in the first separator may include: a first flat portion; a first inclined portion that is bent to be inclined from the first flat portion and extends; a first extension portion that is bent from the first inclined portion and extends parallel to the first flat portion; a first bending portion that is bent from the first extension portion toward the interface with the second separator; and a first facing portion that extends parallel to the first extension portion from the first bending portion and is disposed on the interface with the second separator, and the inner edge of the second manifolds in the second separator may include: a second flat portion; a second inclined portion that is bent to be inclined from the second flat portion and extends; a second extension portion that is bent from the second inclined portion and extends parallel to the second flat portion; a second bending portion that is bent from the second extension portion toward the interface with the first separator; and a second facing portion that extends parallel to the second extension portion from the second bending portion and is disposed on the interface with the first separator.

The first flat portion of the first separator and the second flat portion of the second separator may be facing each other, and the first facing portion of the first separator and the second facing portion of the second separator may be facing each other.

The first flat portion and the first facing portion of the first separator may be disposed on the same plane, and the second flat portion and the second facing portion of the second separator may be disposed on the same plane.

The first extension portion and the first facing portion of the first separator and the second facing portion and the second extension portion of the second separator may be sequentially laminated, and a welding portion that simultaneously welds the first extension portion, the first facing portion, the second facing portion, and the second extension portion may be formed.

Lengths of the first facing portion of the first separator and the second facing portion of the second separator may be less or equal to lengths of the first extension portion of the first separator and the second facing portion of the second separator.

The separator assembly further comprises a first gasket that forms an airtight line and surrounds the inner edge of the first manifolds and a second gasket that forms an airtight line and surrounds the inner edge of the second manifolds. The first gasket may be applied to a predetermined thickness on a surface of the first separator, and the second gasket may be applied to a predetermined thickness on a surface of the separator. The thickness of the first gasket may be greater or equal to a thickness of the first separator, and the thickness of the second gasket may be greater or equal to a thickness of the second separator.

A coating layer for preventing corrosion may be formed on a surface of each of the first separator and the second separator.

An area bent from the first separator toward the second separator and disposed on the interface with the second separator may be an area other than an area to which the reaction gas or the coolant is introduced or discharged to the first reaction area in the inner edge of the first manifolds, and an area bent from the second separator toward the first separator and disposed on the interface with the first separator may be an area other than an area to which the reaction gas or the coolant is introduced or discharged to the second reaction area in the inner edge of the second manifolds.

An area bent from the first separator toward the second separator and disposed on the interface with the second separator and an area bent from the second separator toward the first separator and disposed on the interface with the first separator may be symmetrical to each other with respect to the interface between the first separator and the second separator.

In an aspect, provided is a fuel cell stack formed by laminating multiple unit cells in which each of the unit cells is formed of a membrane electrode assembly, a pair of gas diffusion layers, a first separator, and a second separator. The first separator and the second separator that are facing each other on the unit cells that are adjacent to each other may be bonded and integrated to each other. The first separator may be formed in a plate shape, a center portion thereof may include a first reaction area on which a flow path to which a reaction gas or a coolant flows is formed, and the first separator may include multiple first manifolds to which the reaction gas or the coolant is introduced or discharged to opposite side areas of the first reaction area. The second separator may be formed in a plate shape, a center portion thereof may include a second reaction area on which a flow path to which the reaction gas or the coolant flows is formed, and the second separator may include multiple first manifolds to which the reaction gas or the coolant is introduced or discharged to opposite side areas of the second reaction area. The first separator may include at least a portion of an inner edge of the first manifolds to be bent toward the second separator, thereby being disposed on an interface with the second separator, and the second separator may include at least a portion of an inner edge of the second manifolds to be bent toward the first separator, thereby disposed on the interface with the first separator.

According to various exemplary embodiments of the present invention, by bending and bonding the inner cross-sectional parts of the manifolds that are formed on the anode separator and the cathode separator, a substrate portion of the separator that is exposed when the manifolds are formed is prevented from being directly exposed to generated water or inflow water.

Therefore, conventionally used anti-corrosion gaskets for preventing corrosion do not need to be additionally formed, so that a problem caused by injecting the anti-corrosion gaskets is fundamentally solved.

In addition, since the additional anti-corrosion gaskets are not used, the weight of the separator may be reduced.

In addition, since the substrate portion of the separator unavoidably exposed when the separator is manufactured is bent so as to be prevented from being directly exposed to moisture, corrosion progressed on the cross-sectional parts of the manifolds may be prevented, and increasing of a lifetime of the fuel cell stack may be realized.

Other aspect of the invention are disclosed infra.

BRIEF DESCRIPTION OF THE DRAWINGS

The above and other objectives, features, and other advantages of the present invention will be more clearly understood from the following detailed description when taken in conjunction with the accompanying drawings, in which.

DETAILED DESCRIPTION

Hereinafter, embodiments of the present invention will be described in detail with reference to the accompanying drawings. However, the present invention is not limited to the embodiments disclosed below and will be embodied in different forms which differ from each other, and these embodiments merely make the disclosure of the present invention complete, and those of ordinary skill in the art to which the present invention belongs. In the drawings, like reference numerals refer to like elements.

A fuel cell stack according to an embodiment of the present invention is to prevent corrosion by improving a shape of a separator while a configuration of a conventional fuel cell stack illustrated in FIG. 1 is maintained. In addition, in separators facing each other at adjacent unit cells, a structure of areas on which manifolds are formed is changed and welded to each other and then integrated, so that a substrate of the separator unavoidably exposed when the manifolds are formed is prevented from being directly exposed to moisture.

Therefore, as illustrated in FIG. 1, according to an embodiment of the present invention, the unit cell includes a membrane electrode assembly 10, a pair of gas diffusion layers 20, an anode separator 31, and a cathode separator 32, and the fuel cell stack is formed by connecting multiple unit cells in series. Therefore, the anode separator 31 that forms one unit cell is disposed to face the cathode separator 32 that forms other unit cell adjacent to the one unit cell. In the present embodiment, the anode separator 31 and the cathode separator 32 that are facing each other are bonded and integrated, thereby forming the separator assembly 30.

Figure 4:
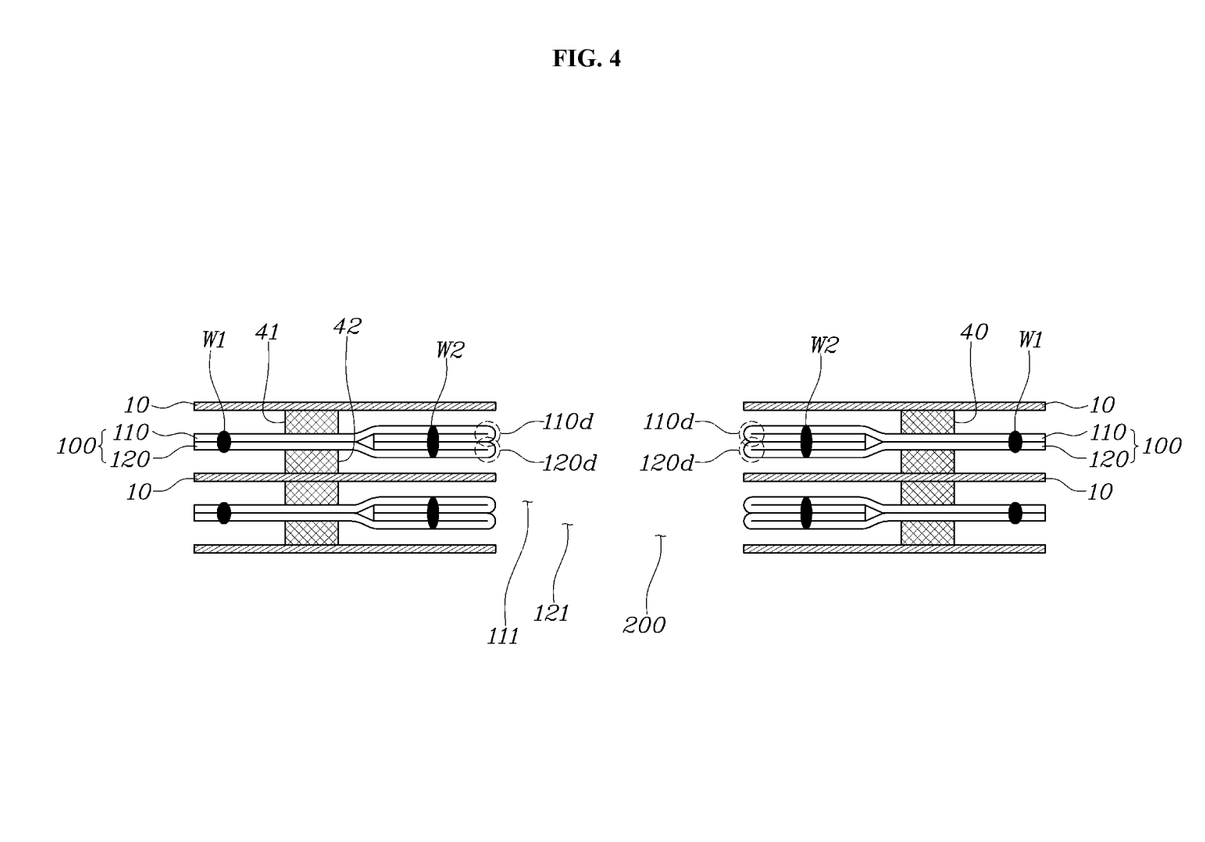
FIG. 4 shows a cross-section around manifolds formed on a fuel cell stack according to an exemplary embodiment of the present invention.
Figure 5:
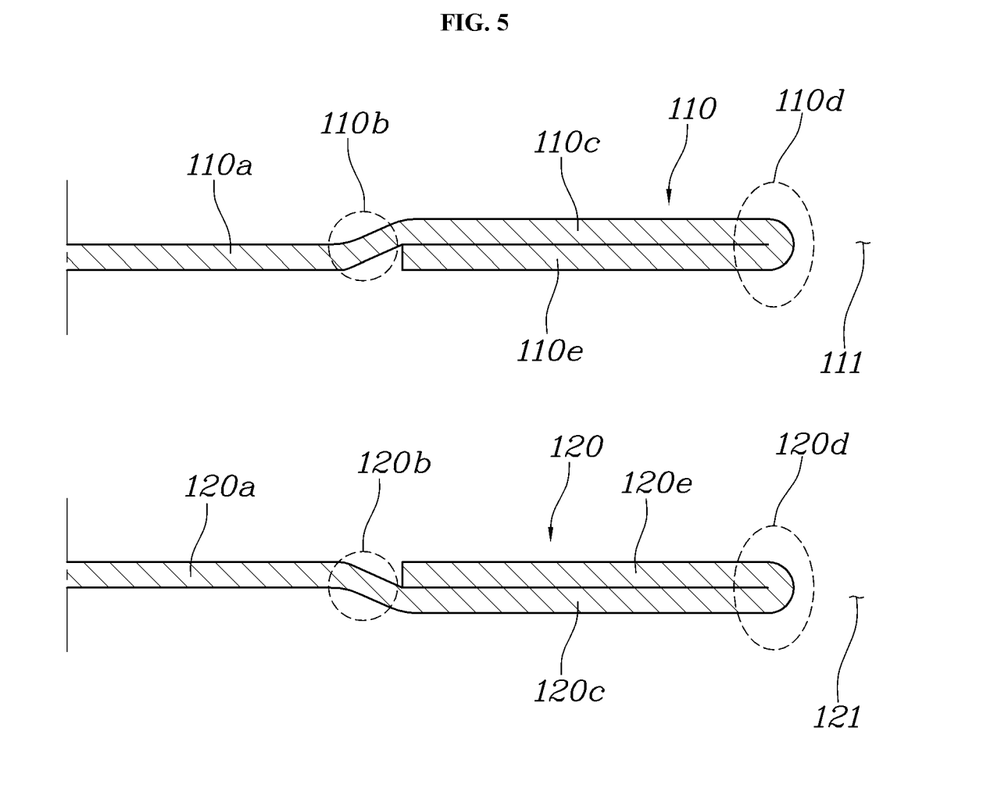
FIG. 5 shows a cross-section of a main part of a first separator that forms an exemplary separator assembly for a fuel cell according to an exemplary embodiment of the present invention.
Figure 6:
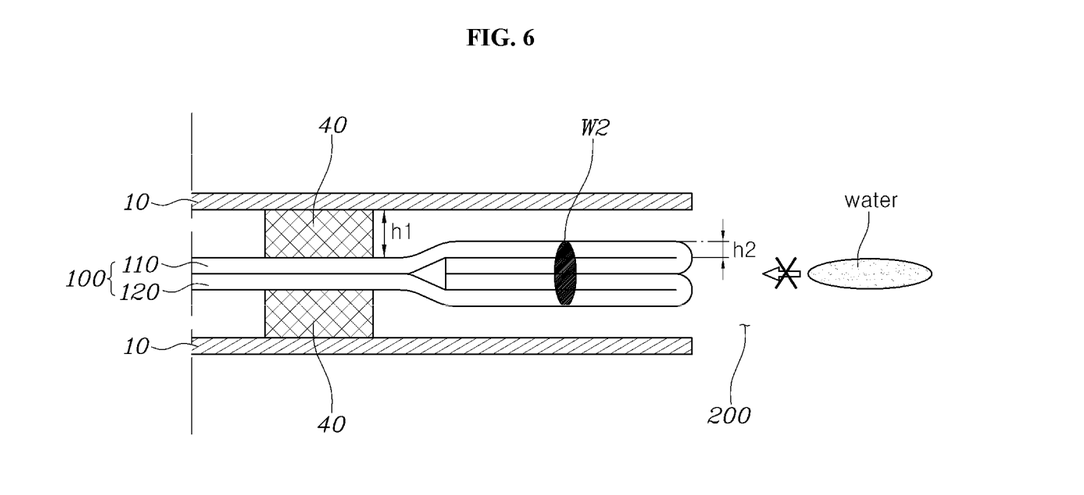
FIG. 6 show a cross-section of a main part of an exemplary separator assembly for the fuel cell, the separator assembly forming the fuel cell stack according to an exemplary embodiment of the present invention.

FIG. 4 shows a cross-section around manifolds formed on an exemplary fuel cell stack according to an exemplary embodiment of the present invention, FIG. 5 shows a cross-section of a main part of a first separator that forms an exemplary separator assembly for a fuel cell according to an exemplary embodiment of the present invention; and FIG. 6 shows a cross-section of a main part of an exemplary separator assembly for the fuel cell, the separator assembly forming the fuel cell stack according to an exemplary embodiment of the present invention. In particular, FIG. 4 shows a cross-sectional view illustrating a portion taken along line A-A in FIG. 2 among cross-sections around the manifolds that are formed on the fuel cell stack according to an exemplary embodiment of the present invention.

The separator assembly 100 according to an exemplary embodiment of the present invention is formed by bonding and integrating a first separator 110 and a second separator 120. For example, the first separator 110 corresponds to the anode separator, and the second separator 120 corresponds to the cathode separator. The first separator 110 is not limited to that corresponding to the anode separator, and the second separator 120 is not limited to that corresponding to the cathode separator. Further, the first separator 110 may correspond to the cathode separator, and the second separator 120 may correspond to the anode separator.

In particular, the first separator 110 and the second separator 120 are formed to have almost the same structure of the conventional separator illustrated in FIG. 2.

For example, the first separator 110 and the second separator 120 that form the separator assembly 100 according to an exemplary embodiment of the present invention are each formed in a plate shape, and are integrated by facing and bonding together.

In particular, since the first separator 110 and the second separator 120 are formed to be symmetrical to each other with respect to surfaces facing each other, the shape and components will be described with reference to the first separator 110, and overlapping descriptions will be omitted.

The first separator 110 is formed in a plate shape. For example, the first separator 110 is manufactured by using aluminum alloy or stainless steel. In order to impart conductivity that is one function of a separator, a surface treatment that imparts conductivity to a surface of the first separator 110 is performed, or a noble metal, a conductive carbon, or the like is coated on the surface of the first separator 110.

In addition, since the first separator 110 is susceptible to corrosion, a coating layer (not illustrated) for preventing corrosion may be formed on the surface of the first separator 110.

Meanwhile, a first reaction area that has a flow path to which the reaction gas or the coolant flows is formed on a center area of the first separator 110, and multiple first manifolds 111 to which the reaction gas or the coolant is introduced or discharged to opposite side areas of the first reaction area are formed on the first separator 110.

In particular, the first manifolds 111 are classified into first manifolds at an inlet side to which the reaction gas or the coolant is introduced and first manifolds at an outlet side to which the reaction gas or the coolant is discharged. Therefore, at a first side of the first separator 110, one first manifold at the inlet side to which hydrogen that is the reaction gas is introduced and two first manifolds at the outlet side to which the coolant and air that is the reaction gas are respectively discharged are formed, as illustrated in FIG. 2. In addition, at a second side of the first separator 110, one first manifold at the outlet side to which hydrogen that is the reaction gas is discharged and two first manifolds at the inlet side to which the coolant and air that is the reaction gas are respectively introduced are formed. Accordingly, hydrogen and air flow in opposite directions, and the coolant and air flow in the same direction. The functionality of the proposed manifolds may be variously changed depending on the shape of the separator and the product specification.

In addition, same as the first separator 110, the second separator 120 is formed in a plate shape, and a second reaction area that has a flow path to which the reaction gas or the coolant flows is formed on a center portion of the second separator 120. Further, multiple second manifolds 121 to which the reaction gas or the coolant is introduced or discharged to opposite side areas of the second reaction area are formed. At this time, the second reaction area is formed on a position corresponding to a position where the first reaction area is formed, and the multiple second manifolds 121 are formed on a position corresponding to a position where the multiple first manifolds 111 that are formed on the first separator 110 are formed.

In particular, as illustrated in FIG. 4, between the first manifolds 111 of the first separator 110 and the second manifolds 121 of the second separator 120, manifolds formed at positions corresponding to each other communicate with each other, so that flow paths 200 are formed.

A piercing treatment as a molding process in a punching manner may be applied to form the multiple first manifolds 111 and the multiple second manifolds 121 when the first separator 110 and the second separator 120 are manufactured. At this time, in order to prevent inner cross-sectional parts of the first manifolds 111 and the second manifolds 121 from being corroded by being directly exposed to moisture, at least a portion of the first manifolds 111 and at least a portion of the second manifolds 121 are bent, so that the inner cross-sectional parts of the first manifolds 111 and the second manifolds 121 do not directly exposed to moisture.

To this end, in the first separator 110, at least a portion of an inner edge of the first manifolds 111 is bent toward the second separator 120 and is disposed on an interface with the second separator 120.

In addition, in the second separator 120, at least a part of an inner edge of the second manifolds 121 is bent toward the first separator 110 and is disposed on the interface with the first separator 110.

In particular, an area bent toward the second separator 120 from the first separator 110 and disposed on the interface between the first separator 110 and the second separator 120 and an area bent toward the first separator 110 from the second separator 120 and disposed on the interface between the first separator 110 and the second separator 120 are formed to be symmetrical with each other with respect to the interface between the first separator 110 and the second separator 120.

In addition, as shown in FIG. 5, the inner edge of the first manifolds 111 in the first separator 110 includes: a first flat portion 110a; a first inclined portion 110b that is bent to be inclined from the first flat portion 110a and extends; a first extension portion 110c that is bent from the first inclined portion 110b and extends parallel to the first flat portion 110a; a first bending portion 110d that is bent from the first extension portion 110c toward the interface with the second separator 120; and a first facing portion 110e that extends parallel to the first extension portion 110c from the first bending portion 110d and disposed on the interface with the second separator 120.

In addition, the inner edge of the second manifolds 121 in the second separator 120 includes: a second flat portion 120a; a second inclined portion 120b that is bent to be inclined from the second flat portion 120a and extends; a second extension portion 120c that is bent from the second inclined portion 120b and extends parallel to the second flat portion 120a; a second bending portion 120d that is bent from the second extension portion 120c toward the interface with the first separator 110; and a second facing portion 120e that extends parallel to the second extension portion 120c from the second bending portion 120d and disposed on the interface with the first separator 110.

Preferably, the first flat portion 110a and the first facing portion 110e of the first separator 110 may be disposed on the same plane, and the second flat portion 120a and the second facing portion 120e of the second separator 120 may be disposed on the same plane.

As shown in FIG. 6, when the first separator 110 and the second separator 120 are in contact with each other and are integrated, the first flat portion 110a of the first separator 110 and the second flat portion 120a of the second separator 120 are facing each other, and the facing portion 110e of the first separator 110 and the second facing portion 120e of the second separator 120 are facing each other.

In addition, the first extension portion 110c and the first facing portion 110e of the first separator 110 and the second facing portion 120e and the second extension portion 120c of the second separator 120 are sequentially laminated.

As shown in FIGS. 4 and 6, a welding portion W1 on which the first flat portion 110a of the first separator 110 and the second flat portion 120a of the second separator 120 are simultaneously welded is formed on an area where the first flat portion 110a of the first separator 110 and the second flat portion 120a of the second separator are facing each other. Further, another welding portion W2 on which the first extension portion 110c and the first facing portion 110e of the first separator 110 and the second facing portion 120e and the second extension portion 120c of the second separator 120 are simultaneously welded is formed on an area where the first facing portion 110e of the first separator 110 and the second facing portion 120e of the second separator 120 are facing each other. As a result, the first separator 110 and the second separator 120 are integrated.

As illustrated in FIGS. 5 and 6, preferably, lengths of the first facing portion 110e of the first separator 110 and the second facing portion 120e of the second separator 120 may be formed to be less or equal to lengths of the first extension portion 110c of the first separator 110 and the second extension portion 120c of the second separator 120. Therefore, the first flat portion 110a and the first facing portion 110e of the first separator 110 are disposed on the same plane, and the second flat portion 120a and the second facing portion 120e of the second separator 120 are disposed on the same plane.

Meanwhile, as illustrated in FIGS. 4 and 6, on the surface of the first separator 110, a first gasket 41 that forms an airtight line surrounding the inner edge of the first manifolds 111 is applied to a predetermined thickness.

Similarly, on the surface of the second separator 120, a second gasket 42 that forms an airtight line surrounding the inner edge of the second manifolds 121 is applied to a predetermined thickness.

In particular, the thickness of the first gasket 41 is formed to be greater or equal to a thickness of the first separator 110, and the thickness of the second gasket 42 is formed to be greater or equal to a thickness of the second separator 120. When the thickness of the first gasket 41 and the thickness of the second gasket 42 are less than the thickness of the first separator 110 and the thickness of the second separator 120, airtightness provided by the first gasket 41 and the second gasket 42 are not ensured since surface pressure is not applied sufficiently on the first gasket 41 and the second gasket 42.

An area bent from the first separator 110 toward the second separator 120 and disposed on the interface with the second separator 120. In particular, an area where the inclined portion 110b, the first extension portion 110c, the first bending portion 110d, and the first facing portion 110e are formed is preferable to be set to be an area other than an area to which the reaction gas or the coolant is introduced or discharged to the first reaction area in the inner edge of the first manifolds 111. The area other than the area to which the reaction gas or the coolant is introduced or discharged to the first reaction area in the inner edge of the first manifolds 111 corresponds to a virtual manifold inner line L2 illustrated in FIG. 2.

When the area where the inclined portion 110b, the first extension portion 110c, the first bending portion 110d, and the first facing portion 110e are formed is formed on the area to which the reaction gas and the coolant is introduced or discharged to the first reaction area in the inner edge of the first manifolds 111, the amount of flow of the reaction gas and the coolant may be reduced since a cross-sectional area of the flow path to which the reaction gas or the coolant is introduced or discharged is reduced due to the formation of the first inclined portion 110b, the first extension portion 110c, the first bending portion 110d, and the first facing portion 110e.

Same as the first separator 110, an area bent from the second separator 120 toward the first separator 110 and disposed on the interface with the first separator 110. An area where the second inclined portion 120b, the second extension portion 120c, the second bending portion 120d, and the second facing portion 120e are formed, is preferable to be set to be an area other than an area to which the reaction gas or the coolant is introduced or discharged to the second reaction area in the inner edge of the second manifolds 121. Same as the first separator 110, in the second separator 120, the area other than the area to which the reaction gas or the coolant may be introduced or discharged to the second reaction area in the inner edge of the second manifolds 121 corresponds to the virtual manifold inner line L2 shown in FIG. 2.

Meanwhile, the area bent from the first separator 110 toward the second separator 120 and disposed on the interface with the second separator 120 and the area bent from the second separator 120 toward the first separator 110 and disposed on the interface with the first separator 110 are preferable to be respectively formed on the multiple first manifolds 111 that are formed on the first separator 110 and the multiple second manifolds 121 that are formed on the second separator 120. However, it is not limited thereto, and the bent shape may be implemented only on the first and second manifolds that are formed on relatively lower portion with respect to a direction of gravity, in the multiple first manifolds 111 and the multiple second manifolds 121. In addition, in the multiple manifolds 111 and the multiple second manifolds 121, the bent shape may be implemented only on the first and second manifolds that are paths to which generated water and air are discharged.

In the separator assembly for the fuel cell and the fuel cell stack including the same configured as described above, as shows in FIG. 6, a structure capable of preventing the inner cross-sectional parts of the first manifolds 111 and the second manifolds 121 from being directly exposed is formed at areas facing the flow paths 200 that are formed such that the first manifolds 111 of the first separator 110 and the second manifolds 121 of the second separator 120 communicate with each other.

In addition, while the first bending portion 110d formed on the first separator 110 and the second bending portion 120d formed on the second separator 120 are exposed to the flow paths 200, a cross-sectional part of the first facing portion 110e and a cross-sectional part of the second facing portion 120e that are susceptible to corrosion due to molding of the punching manner are disposed on an inner side of the interface.

Accordingly, the cross-sectional part of the first facing portion 110e and the cross-sectional part of the second facing portion 120e may be prevented from being directly in contact with the coolant or the generated water that flows to the flow paths 200. As a result, the cross-sectional part of the first facing portion 110e and the cross-sectional part of the second facing portion 120e may be prevented from being corroded by the coolant or the generated water.

Although the present invention has been described with reference to the accompanying drawings and the various exemplary embodiments described above, the present invention is not limited thereto but is limited by the following claims. Accordingly, those skilled in the art may variously modify and changes the present invention without departing from the technical spirit of the following claims.

What is claimed is:

1. A separator assembly for a fuel cell, comprising:
a first separator formed in a plate shape, comprising with a first reaction area on which a flow path to which a reaction gas or a coolant flows on a center portion thereof and multiple first manifolds to which the reaction gas or the coolant is introduced or discharged to opposite side areas of the first reaction area; and
a second separator formed in a plate shape and integrated with the first separator by being bonded, comprising a second reaction area at a position corresponding to a position on which the first reaction area is formed and multiple second manifolds that communicate with the multiple first manifolds,
wherein the first separator comprises at least a portion of an inner edge of the first manifolds to be bent toward the second separator, thereby being disposed on an interface with the second separator, and
the second separator comprises at least a portion of an inner edge of the second manifolds to be bent toward the first separator, thereby being disposed on the interface with the first separator;
wherein an area bent from the first separator toward the second separator and disposed on the interface with the second separator is an area other than an area to which the reaction gas or the coolant is introduced or discharged to the first reaction area in the inner edge of the first manifolds; and
an area bent from the second separator toward the first separator and disposed on the interface with the first separator is an area other than an area to which the reaction gas or the coolant is introduced or discharged to the second reaction area in the inner edge of the second manifolds.

2. The separator assembly of claim 1, wherein the inner edge of the first manifolds in the first separator comprises:
a first flat portion;
a first inclined portion that is bent to be inclined from the first flat portion and extends;
a first extension portion that is bent from the first inclined portion and extends parallel to the first flat portion;
a first bending portion that is bent from the first extension portion toward the interface with the second separator; and
a first facing portion that extends parallel to the first extension portion from the first bending portion and is disposed on the interface with the second separator, and
the inner edge of the second manifolds in the second separator comprises:
a second flat portion;
a second inclined portion that is bent to be inclined from the second flat portion and extends;
a second extension portion that is bent from the second inclined portion and extends parallel to the second flat portion;
a second bending portion that is bent from the second extension portion toward the interface with the first separator; and
a second facing portion that extends parallel to the second extension portion from the second bending portion and is disposed on the interface with the first separator.

3. The separator assembly of claim 2, wherein the first flat portion of the first separator and the second flat portion of the second separator are facing each other, and the first facing portion of the first separator and the second facing portion of the second separator are facing each other.

4. The separator assembly of claim 2, wherein the first flat portion and the first facing portion of the first separator are disposed on the same plane, and the second flat portion and the second facing portion of the second separator are disposed on the same plane.

5. The separator assembly of claim 2, wherein the first extension portion and the first facing portion of the first separator and the second facing portion and the second extension portion of the second separator are sequentially laminated, and a welding portion that simultaneously welds the first extension portion, the first facing portion, the second facing portion, and the second extension portion is formed.

6. The separator assembly of claim 2, wherein lengths of the first facing portion of the first separator and the second facing portion of the second separator are less or equal to lengths of the first extension portion of the first separator and the second facing portion of the second separator.

7. The separator assembly of claim 1, further comprising a first gasket that forms an airtight line and surrounds the inner edge of the first manifolds, the first gasket is applied to a predetermined thickness on a surface of the first separator, and
a second gasket that forms an airtight line and surrounds the inner edge of the second manifolds, the second gasket is applied to a predetermined thickness on a surface of the separator,
wherein the thickness of the first gasket is greater or equal to a thickness of the first separator, and the thickness of the second gasket is greater or equal to a thickness of the second separator.

8. The separator assembly of claim 1, wherein a coating layer is formed on a surface of each of the first separator and the second separator.

9. The separator assembly of claim 1, wherein the area bent from the first separator toward the second separator and disposed on the interface with the second separator and the area bent from the second separator toward the first separator and disposed on the interface with the first separator are symmetrical to each other with respect to the interface between the first separator and the second separator.

10. A fuel cell stack comprising:
multiple unit cells in which each of the unit cells comprises a membrane electrode assembly, a pair of gas diffusion layers, a first separator, and a second separator,
wherein the first separator and the second separator that are facing each other on the unit cells that are adjacent to each other are bonded and integrated to each other,
the first separator is formed in a plate shape, a center portion thereof comprises a first reaction area on which a flow path to which a reaction gas or a coolant flows is formed, and the first separator comprises multiple first manifolds to which the reaction gas or the coolant is introduced or discharged to opposite side areas of the first reaction area,
the second separator is formed in a plate shape, a center portion thereof comprises a second reaction area on which a flow path to which the reaction gas or the coolant flows is formed, and the second separator comprises multiple first manifolds to which the reaction gas or the coolant is introduced or discharged to opposite side areas of the second reaction area, the first separator comprises at least a portion of an inner edge of the first manifolds to be bent toward the second separator, thereby being disposed on an interface with the second separator, and the second separator comprises at least a portion of an inner edge of the second manifolds to be bent toward the first separator, thereby being disposed on the interface with the first separator;

wherein an area bent from the first separator toward the second separator and disposed on the interface with the second separator is an area other than an area to which the reaction gas or the coolant is introduced or discharged to the first reaction area in the inner edge of the first manifolds; and an area bent from the second separator toward the first separator and disposed on the interface with the first separator is an area other than an area to which the reaction gas or the coolant is introduced or discharged to the second reaction area in the inner edge of the second manifolds.

* * * * *